 United States Patent
Yetukuri et al.

(10) Patent No.: US 9,499,072 B2
(45) Date of Patent: Nov. 22, 2016

(54) SEAT CUSHION LENGTH EXTENDER WITH SENSOR

(71) Applicant: Lear Corporation, Southfield, MI (US)

(72) Inventors: Arjun Yetukuri, Rochester Hills, MI (US); Mark A. Farquhar, Ortonville, MI (US); David A. Hein, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 41 days.

(21) Appl. No.: 14/614,892

(22) Filed: Feb. 5, 2015

(65) Prior Publication Data

US 2015/0231991 A1  Aug. 20, 2015

Related U.S. Application Data

(60) Provisional application No. 61/940,668, filed on Feb. 17, 2014.

(51) Int. Cl.
*B60N 2/02* (2006.01)
*B60N 2/00* (2006.01)
*B60N 2/62* (2006.01)

(52) U.S. Cl.
CPC ............. *B60N 2/0284* (2013.01); *B60N 2/002* (2013.01); *B60N 2/62* (2013.01); *B60N 2002/0268* (2013.01)

(58) Field of Classification Search
CPC ...... B60N 2/0284; B60N 2/002; B60N 2/62; B60N 2002/0212; B60N 2002/0268
USPC .................. 297/284.11, 217.2, 217.3; 701/49
See application file for complete search history.

(56) References Cited

U.S. PATENT DOCUMENTS

| | | | |
|---|---|---|---|
| 6,088,642 A | 7/2000 | Finkelstein et al. | |
| 7,874,621 B2 * | 1/2011 | Gumbrich | B60N 2/0232 297/284.11 |
| 8,600,626 B2 * | 12/2013 | Yamaguchi | B60N 2/002 297/216.1 |
| 2005/0173963 A1 | 8/2005 | Edrich et al. | |
| 2006/0208549 A1 | 9/2006 | Hancock et al. | |
| 2007/0090673 A1 * | 4/2007 | Ito | B60N 2/0284 297/330 |
| 2008/0191531 A1 * | 8/2008 | Hoffmann | B60N 2/0284 297/284.1 |
| 2009/0224584 A1 | 9/2009 | Lawall et al. | |
| 2011/0147051 A1 | 6/2011 | Sims et al. | |

(Continued)

FOREIGN PATENT DOCUMENTS

| | | |
|---|---|---|
| WO | 2008024306 A1 | 2/2008 |
| WO | 2009103653 A1 | 8/2009 |

*Primary Examiner* — Milton Nelson, Jr.
(74) *Attorney, Agent, or Firm* — Brooks Kushman P.C.

(57) ABSTRACT

Seats and methods for controlling a seat are described. A position of the user's leg is sensed relative to the position of the front of the seat. A determination is made as to if the position of the user's leg from a front of the seat is greater than a gap minimum. If the gap is greater than the gap minimum, a cushion length extender portion of the seat is moved until the sensed position is less than or equal to the gap minimum. In an example, the remainder of seat base is held in a fixed position within the vehicle environment. In an example, sensing can include capacitively sensing a position of the user's leg. In an example, sensing can use at least one of a thermal sensor, a light sensor, a radio frequency sensor, a microwave sensor or combinations thereof to sense the position of the user's leg. The gap minimum can be with the cushion length extender portion in slight contact with the user's leg. The sensor can be at a front face of seat. The sensor can be on the cushion length extender portion of the seat.

20 Claims, 7 Drawing Sheets

(56) References Cited

U.S. PATENT DOCUMENTS

2011/0260506 A1* 10/2011 Kuno .................. B60N 2/4495 297/84

2012/0041648 A1* 2/2012 Yamaguchi ............ B60N 2/002 701/49

2012/0267928 A1 10/2012 Mankame et al.

* cited by examiner

FIG. 7

SEAT CUSHION LENGTH EXTENDER WITH SENSOR

The present U.S. Utility Patent Application claims priority pursuant to 35 U.S.C. §119(e) to the U.S. Provisional Patent Application 61/940,668, filed Feb. 17, 2014, which is hereby incorporated herein by reference in its entirety and made part of the present U.S. Utility Patent Application for all purposes.

TECHNICAL FIELD

The following relates to a system and method for controlling the movement of a seat in a vehicle and, more specifically, to controlling movement of a seat cushion support portion of the seat.

BACKGROUND

Automotive vehicles often include electrically powered systems for control of seat movement or seat positions. Such systems may provide for movement or adjustment of various seat portions in a variety of directions, which can include moving a seat bottom forward, rearward, upward and/or downward, as well as forward or rearward reclining or tilting of a seat back. Such controls and positioning of the seat may provide improved ergonomics to the user.

Exemplary vehicle seat control systems are shown in U.S. Patent Application Publication No. 2006/0208549 titled "Automotive Seat With Control System" and International Application Publication No. WO 2008/024306 titled "Object Detection System And Method For Moving Vehicle Seat." Exemplary sensors for use in vehicle seats are shown in U.S. Patent Application No. 2011/0147051 titled "Capacitive Switch Sensors On Decorative In-Mold Films Background;" International Patent Application Publication No. WO 2009/103653 titled "Flexible Seat Sensor Product;" and U.S. Patent Application No. 2009/224584A titled "Active Material Actuated Seat Base Extender."

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
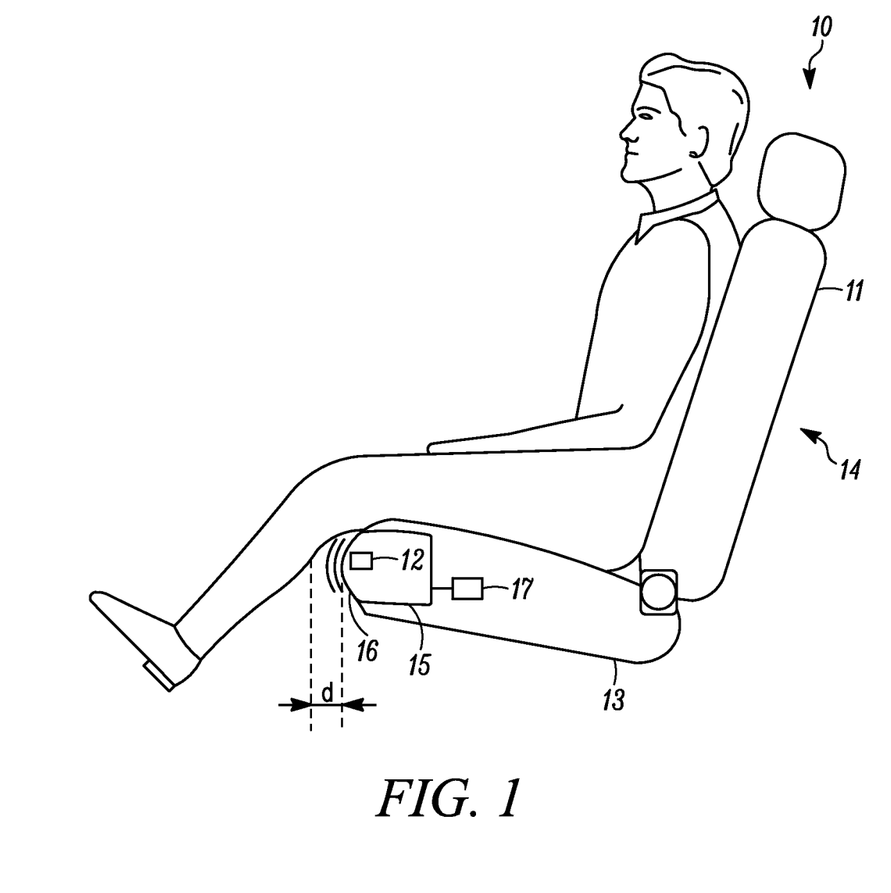
FIG. 1 shows a schematic view of a seat with cushion length extender.

Referring now to FIG. 1, a vehicular environment is shown for one embodiment of a vehicle seat system 10 of the present disclosure with a user sitting on the seat system. A seat 11 can include a seat base 13 and a seat back 14. A sensor 12 can be positioned in a seat base 13 and may be used to slow, limit, stop, reverse or otherwise control seat base movement or movement of a portion of the seat base automatically without intervention by a user. In an example, the seat base 13 may support the user's upper leg, for example, thigh, by controlling position of the cushion length extender 15 of the seat base 13. In an example, the cushion length extender 15 is part of the seat base 13 and is configured to move relative to the remainder of the seat base 13. The positioning of the cushion length extender 15 depends on the length of the user's leg and the size of the seat base 13. That is, the seat base 13 may not fully support a user's leg for all sizes of users. The sensor 12, which could be capacitive, RF based or temperature based, may be used to detect the position of the user, and, more specifically, the user's leg with the user being seated in the seat 11. The sensor 12 may also detect the user being seated in the seat 10 and then activate to detect the position of the user and, e.g., at least one of the user's legs. The position is sensed as distance "d" in FIG. 1. In an example, the distance may be set to a gap distance that is adjacent the user's leg but not touching the lower part of the user's leg that extends downwardly toward the vehicle floor or pedal. The sensor may also detect the position of the seat relative to the vehicle environment, e.g., as described in U.S. patent application Ser. No. 13/834,378, to set a limit on the amount of travel for the seat cushion extender 15, for example, when the seat is moved to its forward most position with the vehicle cabin. The cushion length extender 15 is shown in a retracted position in FIG. 1. The retracted position may be desirable for entry to and exiting from the vehicle or for users who have shorter legs. The retracted position of the cushion length extender 15 results in the seat base having a shorter seat base length than an extended position of the cushion length extender that increases the seat base length. It will be appreciated that the seat system 10 will include a stand (not shown) that fixes the seat 11 to the vehicle, e.g., the floor of the vehicle.

The cushion length extender 15 includes an actuator 17 that provides linear motion to the cushion length extender 15 in response to received electrical control signals, which may be based on signals from the sensor 12. The actuator 17 is shown positioned in the seat base 13 in this example. The actuator 17 can be fixed relative to the seat base 13, a frame of the seat or an internal seat support. The front edge 16 of the cushion length extender 15 is essentially positioned at the front edge of the remainder of the seat base 13. In an example, the front edge 16 also defines the front most surface of the seat base 13. The sensor 12 can be positioned in the cushion length extender 15 adjacent its front edge 16 such that when a user (e.g., a driver) is in the vehicle and on the seat 11 the sensor can sense the user's leg with the leg in front of the edge 16.

Figure 2:
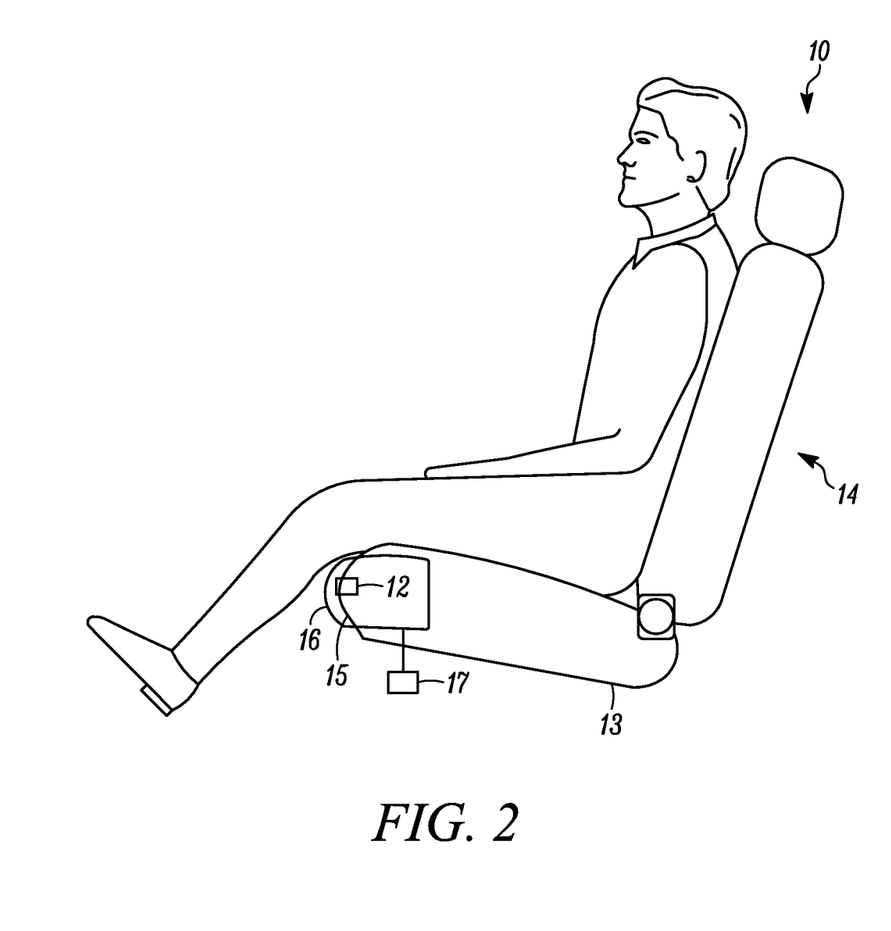
FIG. 2 shows a schematic view of a seat with cushion length extender.

FIG. 2 shows the cushion length extender 15 of the seat 11 in the extended position after sensing the position of the user by the sensor 12. Based on sensed location of the user, the cushion length extender 15 moves from the retracted position (FIG. 1) to the extended position (FIG. 2). The extended position of the cushion length extender provides greater support to the upper leg (i.e., at least part of the thigh) of the user. The actuator 17 is shown positioned below in the seat base 13 in this example and can be, in an example, mounted to the seat stand. The cushion length extender 15 moves the location of the front edge of the seat forward, i.e., left in FIGS. 1 and 2, in the direction the user is facing. The top surface of the cushion length extender 15 contacts the underside of the user's upper leg, e.g., thigh, and supports the user's leg. Currently positioning the cushion length extender 15 relative to the person's leg may increase the comfort of the person. As shown in FIG. 2, the front edge 16 of cushion length extender 15 may contact the back of the user's knee and the lower leg just below the knee. In some examples, the front edge may stop just short of contacting the user's leg and leave a gap therebetween, which can be sensed by sensor 12 and controlled based on the sensed information from the sensor 12.

Figure 3:
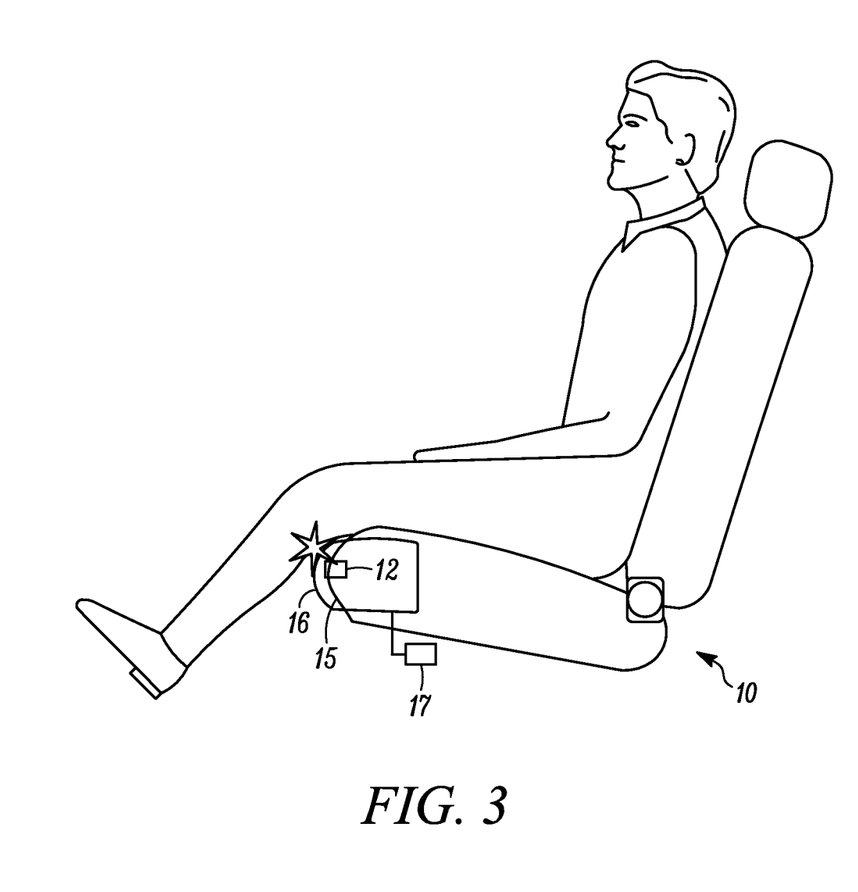
FIG. 3 shows a schematic view of a seat with cushion length extender.

FIG. 3 shows the cushion length extender 15 of the seat 11 in another extended position after sensing by the sensor 12 of the position of the user. In the FIG. 3 position, the cushion length extender 15 has undesirably moved too far forward (left in FIG. 3) and its front edge 16 has contacted the back of the user's lower leg, e.g., behind the knee or along the calf. If the extender 15 moves beyond a slight contact against the user's leg, the extender 15 may strongly press on the leg and may undesirably inhibit movement, decrease comfort of the user or even extend the user's leg. The sensor 12 can sense the distance between the front of the cushion length extender and the user's lower leg and stop forward movement of cushion length extender before contact with the user's leg. In some use cases, the user may adjust their position and come into contact with the front edge 16. In this case, the sensor 12 can sense this change in user position and adjust the cushion length extender 15 from the contacting position (FIG. 3) to a correct position with a gap that is larger than a minimum distance and smaller than a maximum distance. Alternatively, sensor 12 may comprise a contact pressure sensor that allows a slight pressure between the cushion length extender 15 and the user's leg. In this example, the gap between the cushion length extender and the user's leg just closed. The closed gap maintains this slight pressure through retraction of the cushion length extender 15 if the user changes position such that the contact pressure increases.

Figure 4:
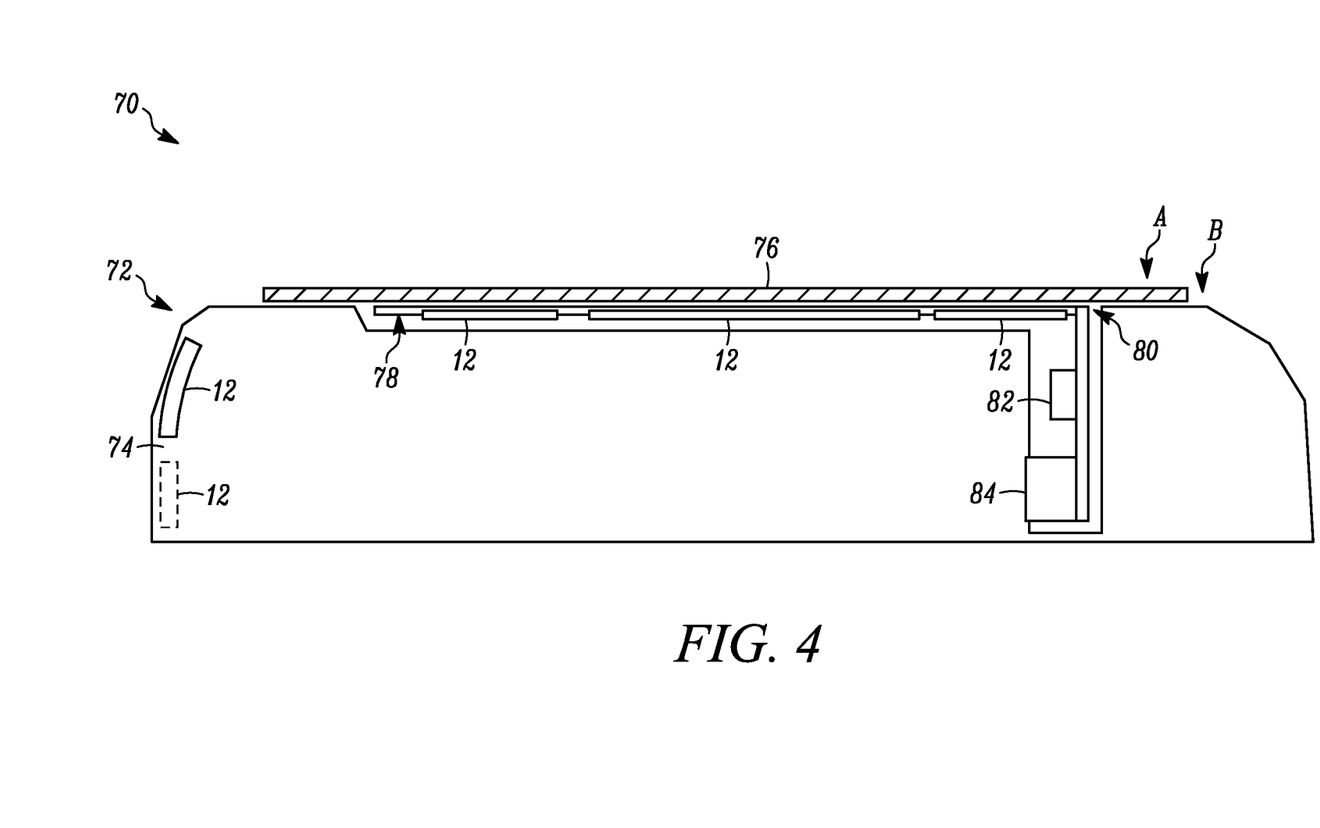
FIG. 4 is a cross-sectional diagram of a sensor assembly in an exemplary vehicular environment for use in embodiments of the system and method for controlling movement of a vehicle seat of the present disclosure.

FIG. 4 shows a cross-sectional diagram of a sensor assembly 70 in an exemplary vehicular environment for use with the seating system 10 (FIGS. 1-3). As seen therein, a structure 72 of the seat base 13 can include body 74 and a trim 76, which may have an outside surface (A) and substrate (B). One or more sensors 12, which may be capacitive sensors, light sensors, RF sensors, microwave sensors or temperature sensors, can be part of a flexible circuit 78 (which may have a thickness of approximately 0.002 inches) positioned between the body 74 and the trim 76 of the structure 72. The sensor assembly 70 may also include a printed circuit board 80 having other electrical circuitry 82 and/or a connector or electrical wire harness interface 84. The sensor 12 can extend around the front edge of the seat cushion. In an example, the sensor 12 extends from a top surface of the seat to about halfway down the front of the seat. In an example, the sensors 12 are placed at the front of the seat assembly.

Figure 5:
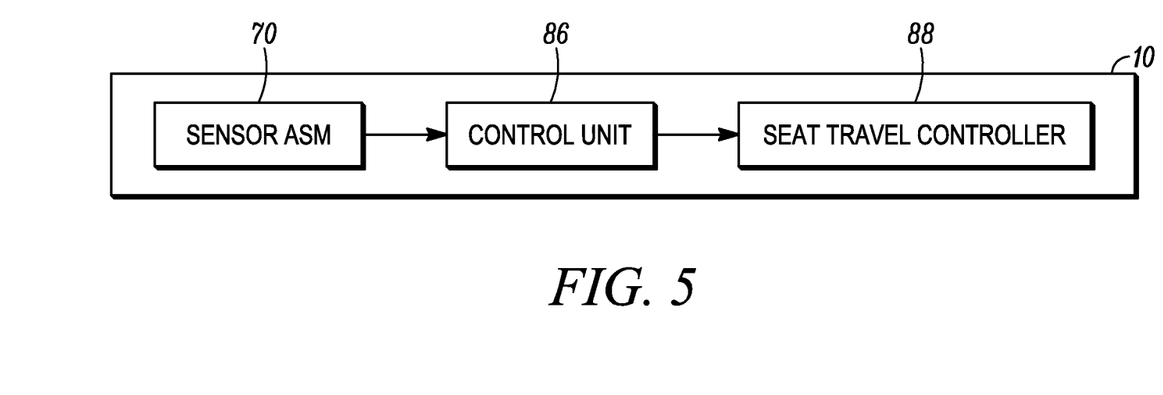
FIG. 5 is a simplified block diagram of an embodiment of the sensor system.

FIG. 5 shows a simplified block diagram of an embodiment of the seating system 10 and associated method(s) for controlling movement of a vehicle seat 11. As seen therein, the sensor assembly 70 may be provided in communication with a control unit 86, which may be provided in communication with a seat movement controller 88, thereby enabling operation of the system 10 and associated method for slowing, limiting, stopping, reversing or otherwise controlling seat movement as described herein, e.g., travel of the cushion length extender 15. The control unit 86 can include circuitry such as discrete components, switches, Application-Specific Integrated Circuits (ASICs), programmable logic arrays, and memory devices or other computing devices.

The control unit 86 can also act as a learning algorithm that can allow the user to position the cushion length extender at a desired location. The control unit 86 can receive a selection indication from the user that the current position of the cushion length extender is the desired location. The control unit 86 can receive the indication through a switch located in the seat or through vehicle input means, such as a touchscreen, voice commands, data entry switches in the vehicle, key fobs and the like. In another example, the user moves the cushion length extender to a desired location multiple times and the control unit 86 associates that position with the user and stores that repeated location as the desired location of the cushion length extender. The control unit 86 can also process the data associated with the user's positioning of the cushion length extender to arrive at a predicted position of the cushion length extender 15 for that user. In an example, the control unit 86 can average the manual positioning of the cushion length extender 15 over a few, e.g., greater than two, positioning actions by the user. The control unit can also use other statistics, e.g., a median value or a greatest frequency, to select the position of the cushion length extender. The control unit 86 can use the sensor to determine the position of cushion length extender 15 or use the state (e.g., position) of the actuator 17 to determine the position of the cushion length extender 15. It will be appreciated that the control unit 86 in these examples learns the position of the cushion length extender over use time by the user.

Figure 6:
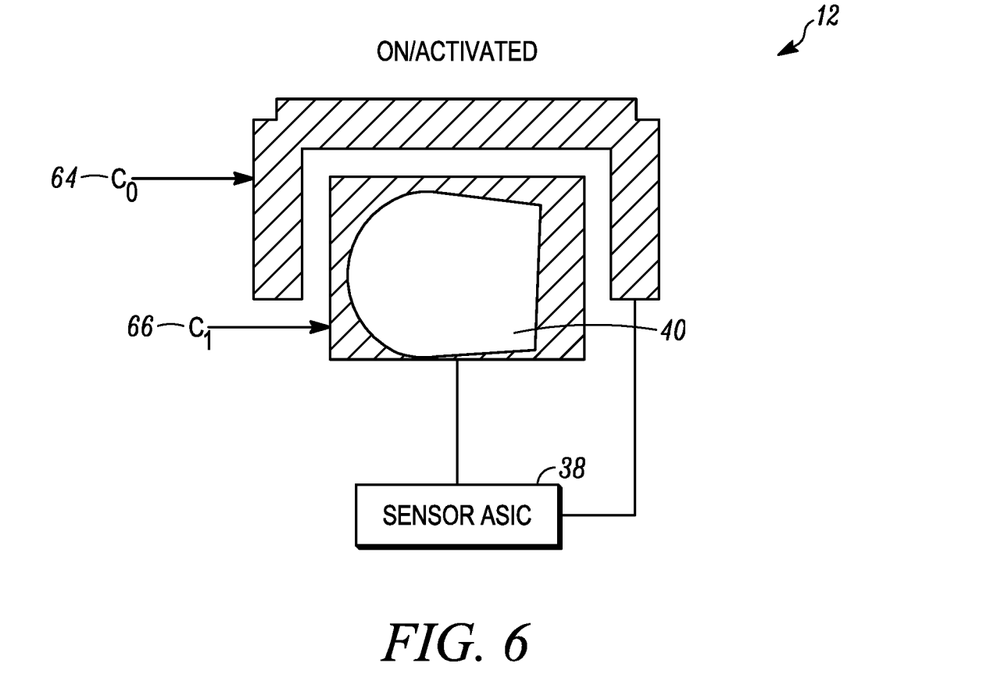
FIG. 6 is a simplified block diagram of an embodiment of the sensor

FIG. 6 is a simplified schematic of a sensor 12 for use in embodiments of the seating system 10 and related method(s) for controlling movement of a vehicle seat 11. The sensor 12 can be capacitive in nature and may include capacitors $C_0$ 64 and $C_1$ 66, as well as one or more circuitries 38 to execute electrical operations. The circuitry can include ASICs, processors, logic gate arrays, switches, memories and combinations thereof. A conductive object (such as a body part of a user 40, driver or occupant) positioned closer to capacitor $C_1$ 66 than capacitor $C_0$ 64 increases the capacitance of $C_1$ 66 more than the capacitance of capacitor $C_0$ 64. Thus, the change in the capacitance of $C_1$ 66 is a function of the distance of an object 40 from the capacitor $C_1$ 66, as well as the area of the pad of capacitor $C_1$ 66 coupled to the object 40, which provides an indication of the size of the sensed object 40 in order to help prevent false indications of proximity. The sensor 12 may be configured such that a sufficient increase in the capacitance of $C_1$ 66 relative to that of capacitor $C_0$ 64 detects a switch activation, thereby indicating the presence of an object 40 which may be used to slow, limit, stop, reverse or otherwise control the position of the cushion length extender, i.e., set travel, movement or position. Filtering may also be employed to require a time lapse before such a detected change in capacitance will be accepted for purposes of switch activation.

Figure 7:
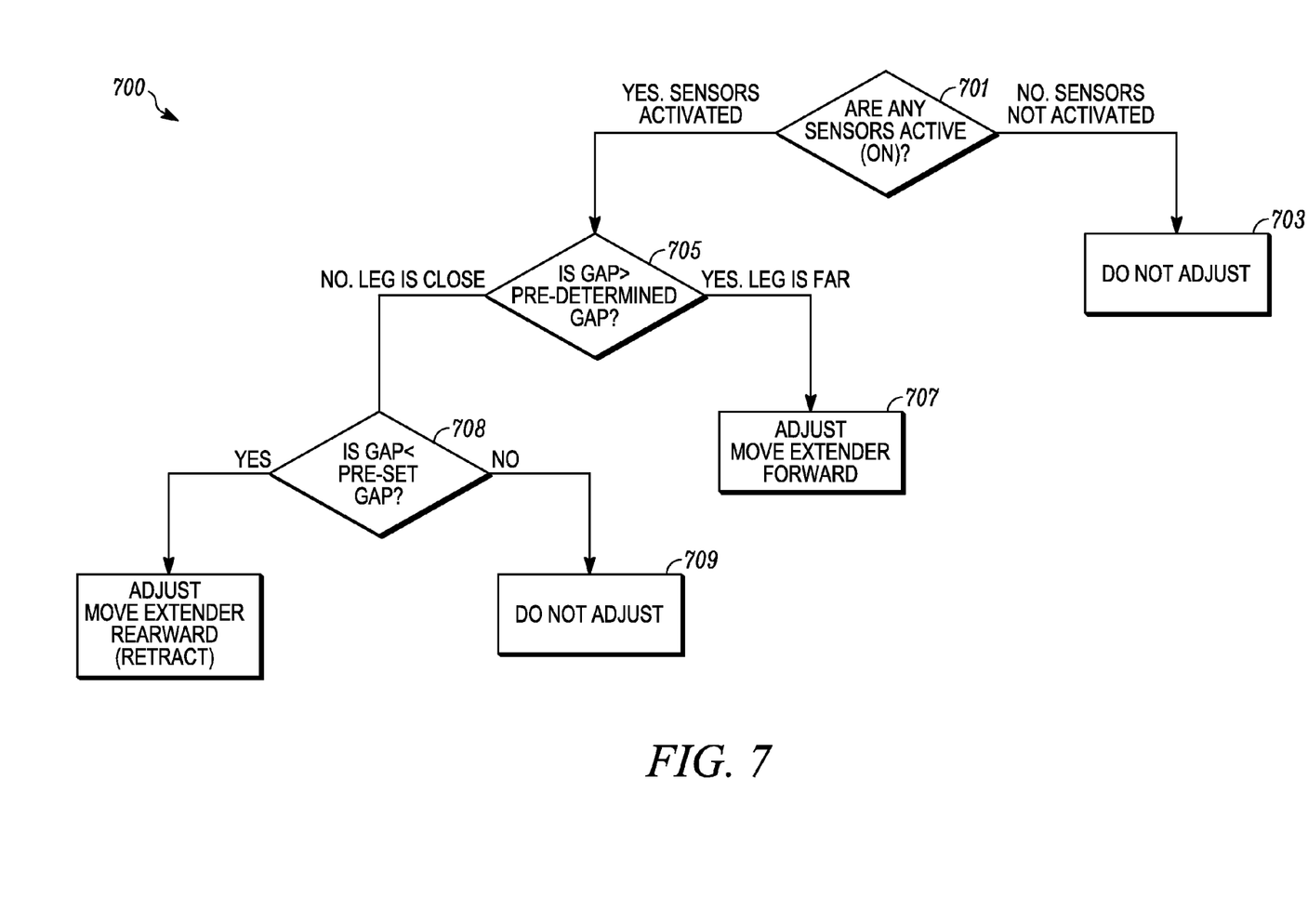
FIG. 7 shows a method of operating the seat.

FIG. 7 shows a flowchart of a method 700 for controlling a seat, e.g., seat 10. At 701, it is determined whether the sensors are active, i.e., "on." The sensor(s) can be "off" based on the state of the vehicle, e.g., the vehicle is off, there is no power to the sensors, or the user has turned off this feature. At 703, if the sensor(s) are "off", then the seat does not adjust and the cushion length extender remains in its default state, which may be the retracted position. At 705, if the sensor(s) is on, the system determines if there is a gap between the front edge of the seat and the leg of the user. If the gap is greater than a predetermined gap, then the system determines that the leg is not supported by the cushion length extender. The predetermined gap can be set by the user as an input to the vehicle. The predetermined gap can alternatively be set by the vehicle manufacturer. At 707, the cushion length extender moves forward, either a distance as determined by the system or begins movement and then returns to step 705. If at 708, it is determined that the gap distance from the front edge of the seat to the user's leg is less than the predetermined gap, then the system determines that the leg is closer to the front edge of the seat than desired and the cushion length extender move retracts toward the seat and away from the user's leg. Once the gap distance is reached, step 709, the cushion length extender stays in its position.

In an example method, the seating system can include contact pressure sensors located in the seat cushion extender. The seat cushion extender can operate to provide a preset level of pressure to the back of the user's lower leg. The user can select pressure settings selectable from pre-set levels (for example, high, med, low). In another example, the user sets the pressure during a learning phase, wherein the sensor with the cushion length extender moves towards the user's leg and applies pressure. Once the user's desired pressure is reached, the user halts the movement of the cushion length extender and the seating system stores this pressure value as the desired or set pressure for movement of the cushion length extender. In operation after the learning phase, once the selected pressure is reached, the sensor and the cushion length extender stop moving forward. For example, when the pressure matches the occupant's desired setting or distribution pattern is achieved, the extender halts for the remaining of this drive cycle unless another adjustment is requested.

As described herein, the position of the thigh support of a seat, e.g., for a vehicle, can be adjusted to better support the user. In an example, a sensor uses capacitive sensing to send a signal to automatically control an actuator that can extend the front portion of the cushion until it senses the occupant (ex: occupant's calf). In an example, a sensor uses pressure sensing to determine the position of the front portion of the seat cushion, e.g., the cushion length extender, relative to the user's leg. In other examples, the system can have adjustable sensing, e.g., based on selectable pre-set settings based on pressure sensing such as high, low, medium or corresponding values. In another example, the seating system provides adjustable sensing with a continuous spectrum adjustable pressure settings using a known pressure spot whereat the user's leg contacts the seat extender. In an example, it may be desirable to return cushion length extender to the full in position when the vehicle is turned off to allow easy exit and reentry.

As described herein the sensor can be located in the seat base cushion length extender. Positioning the sensor at the cushion length extender may allow the use of either a capacitive sensor in an example or a pressure sensor in an example. When using a pressure sensor, the user selects a pressure setting. The sensor allows the cushion length extender to move towards the user's leg and to apply a pressure to the user's leg. When the pressure matches the occupant's desired setting or distribution pattern is achieved, the extender halts for the remaining portion of this drive cycle unless another adjustment is requested. Other types of sensors can also be used to control the movement of the cushion length extender. Examples include radio frequency sensor, microwave sensor, temperature sensor and infrared sensor. However, the use of a light sensor will require the emitter to extend through the material of the seat or the seat material to be transparent to the light or other signal sent by the sensor.

The presently described seat systems and methods are equally applicable to front seats and rear seats. The front seats can be bucket seats, e.g., seats built for a single person. The rear seats can be bucket seats or seat assemblies that support more than one person. In the case of a seat assembly, for example, a bench type seating arrangement. In an example, the sensor will interact only with the person seating in an aligned position with the cushion length extender.

The cushion length extender, in an example, can have a width that is substantially the same width and the rest of the seat base such that when the cushion length extender moves the width of the seat base seems essentially uniform to the user. In another example, the cushion length extender is narrower than the remainder of the seat base.

The presently described examples can offer an innovative feature of self-adjusting upper leg support for a user. This may increase the comfort level of the user and increase the satisfaction level of vehicle as experienced by the user. The user may be the occupant of the seat, the owner/operator of the vehicle or other people. Self-adjusting can include, but is not limited to, the user turning on this feature via vehicle controls or a mobile device. The user can also select the minimum gap distance from their leg to the front of the seat base. The seating system may also turn off if a user is not seated on the seat. This can be done with a pressure sensor or other weight sensor in the seating system. The seating system sensing the position of the user's leg, e.g., the leg nearest the seat front edge. The seating system can continuously sense the position of the leg and also continuously adjust the cushion length extender position. There can be some minimum change in the gap before the cushion length extender adjusts as the sensor may have a greater resolution of distance than the user would enjoy changes in the position of the cushion length extender.

The present application makes reference to co-pending U.S. patent application Ser. No. 13/834,378, which is hereby incorporated by reference for any purpose, including combining the present explicit disclosure with the disclosure of application Ser. No. 13/834,378.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

We claim:
1. A vehicle seat comprising:
   a seat assembly with a cushion length extender extending from a seat base;
   a sensor in the seat assembly configured to sense a position of a user's leg relative to the seat base;
   circuitry to store a user setting to control positioning the cushion length extender of the seat assembly, wherein the circuitry is operatively connected to the sensor and configured to determine if the position of the user's leg from a front of the seat base is greater than a predetermined distance, if a gap between the user's leg and the cushion length extender is greater than the predetermined distance, the cushion length extender operating to extend the seat base until the position is less than or equal to the predetermined distance.

2. The vehicle seat of claim 1, wherein the user setting is the predetermined distance by positioning the cushion length extender and entry of a setting into the circuitry or the circuitry setting the predetermined distance by processing positioning of the cushion length extender by the user over time.

3. The vehicle seat of claim 1, wherein the cushion length extender retracts to shorten the seat base when the sensed position from the sensor is less than the predetermined distance.

4. The vehicle seat of claim 1, wherein the sensor is configured to capacitively sense a position of the user's leg.

5. The vehicle seat of claim 1, wherein the sensor includes at least one of a thermal sensor, a light sensor, a radio frequency sensor, a microwave sensor or combinations thereof to sense the gap between the front of the seat base and the user's leg.

6. The seat of claim 1, wherein the predetermined gap is with the cushion length extender adjacent and free from contact with the user's leg.

7. The seat of claim 1, wherein the sensor comprises a pressure sensor.

8. The vehicle seat of claim 1, wherein the user setting is a pressure that the front on the cushion length extender applies to the user's leg when the cushion length extender is extending the seat base.

9. The vehicle seat of claim 8, wherein the sensor is configured to sense a pressure applied by the cushion length extender.

10. A vehicle seat comprising:
   a seat assembly with a cushion length extender configured to extend a seat base;
   a sensor in the seat configured to sense a gap between a user's leg relative to a front of the seat base;
   circuitry operatively connected to the sensor configured to determine if a position of the user's leg from the front of the seat base has a sensed gap greater than a predetermined gap,
   if the sensed gap is greater than the predetermined gap, moving the cushion length extender of the seat until the sensed gap is less than or equal to the predetermined gap.

11. The seat of claim 10, wherein the sensor includes at least one of a thermal sensor, a light sensor, a radio frequency sensor, a microwave sensor or combinations thereof to sense the gap between the front of the seat base and the user's leg.

12. The seat of claim 10, wherein the sensor is positioned at a front of the seat assembly.

13. The seat of claim 10, wherein the sensor is mounted in the cushion length extender of the seat.

14. The seat of claim 10, wherein the predetermined gap is with the cushion length extender in contact with the user's leg.

15. The seat of claim 14, wherein the sensor comprises a pressure sensor.

16. The seat of claim 10, wherein the seat base is in a fixed position within a vehicle environment.

17. The seat of claim 16, wherein the sensor is configured to capacitively sense a position of the user's leg.

18. The seat of claim 17, wherein the sensor is positioned at a front of the seat assembly.

19. The seat of claim 17, wherein the sensor is mounted in the cushion length extender.

20. The seat of claim 17, wherein the sensor is configured to sense a change in user position and wherein the circuitry is configured to adjust the cushion length extender based on the change in user position to maintain the sensed gap at less than or equal to the predetermined gap.

* * * * *